United States Patent

Monér, Jr. et al.

[11] Patent Number: 5,988,579
[45] Date of Patent: Nov. 23, 1999

[54] VEHICLE CUPHOLDER ASSEMBLY

[75] Inventors: Bernard Monér, Jr., Wayne; Richard E. Power, Rochester Hills, both of Mich.

[73] Assignee: Lear Corporation, Southfield, Mich.

[21] Appl. No.: 09/007,435

[22] Filed: Jan. 15, 1998

[51] Int. Cl.$^6$ .................................................. A47K 1/08
[52] U.S. Cl. ................................... 248/311.2; 248/285.1; 224/926
[58] Field of Search ..................... 248/311.2, 685, 248/310, 346.06, 346.07, 912, 309.1, 313, 316.5, 316.6, 298.1, 285.1, 292.13, 222.13, 231.31; 297/188.01, 188.14; 224/281, 483, 926, 552, 553

[56] References Cited

U.S. PATENT DOCUMENTS

| | | | |
|---|---|---|---|
| 4,981,277 | 1/1991 | Elwell | 248/311.2 |
| 5,131,716 | 7/1992 | Kwasnik et al. | 297/194 |
| 5,259,580 | 11/1993 | Anderson et al. | 248/311.2 |
| 5,284,314 | 2/1994 | Misaras et al. | 248/311.2 |
| 5,289,962 | 3/1994 | Tull et al. | 224/273 |
| 5,318,343 | 6/1994 | Spykerman et al. | 297/194 |
| 5,487,519 | 1/1996 | Grabowski | 248/311.2 |
| 5,489,054 | 2/1996 | Schiff | 224/281 |
| 5,524,958 | 6/1996 | Wieczorek et al. | 297/188.17 |
| 5,527,008 | 6/1996 | Schutter et al. | 248/311.2 |
| 5,598,999 | 2/1997 | Plocher et al. | 248/311.2 |
| 5,800,011 | 9/1998 | Spykerman | 248/311.2 |
| 5,839,710 | 11/1998 | Hubbard | 248/311.2 |
| 5,857,633 | 1/1999 | Pelchat, II et al. | 248/311.2 |

*Primary Examiner*—Ramon O. Ramirez
*Attorney, Agent, or Firm*—Brooks & Kushman P.C.

[57] ABSTRACT

A cupholder assembly is adapted for use in a vehicle for supporting containers. The cupholder assembly includes a housing having a receiving aperture formed therein. A tray is slidably connected within the receiving aperture for sliding movement between storage and use positions. The first and second cupholder arms are pivotally connected to the tray for pivotal movement between fully extended and fully retracted positions. Each cupholder arm includes a side wall for supporting a side of a container. Pivotal movement of each cupholder arm with respect to the tray is sufficiently frictionally inhibited to facilitate infinite adjustment of the cupholder arms between the fully extended and fully retracted positions for supporting containers of various sizes. The frictional inhibition is facilitated by a pinching structure in cooperation with a rubber portion on each cupholder arm. The cupholder arms are frictionally inhibited when the tray is in the extended use position, and are free to rotate as the tray moves from the use position toward a stored position within the housing. Infinite adjustability of the cupholder arms is accomplished.

14 Claims, 7 Drawing Sheets

5,988,579

VEHICLE CUPHOLDER ASSEMBLY

TECHNICAL FIELD

The present invention relates to a vehicle cupholder assembly, and more particularly to a vehicle cupholder assembly which is infinitely adjustable for supporting containers of various sizes.

BACKGROUND OF THE INVENTION

The prior art includes a variety of cupholders or container holders which are used for supporting cups, cans or other beverage containers in vehicles which are selectively accessible to the vehicle passengers or occupants.

Some such cupholder devices include adjustability features for holding containers of various sizes. However, such adjustable cupholders generally require some sort of gearing structure for incremental adjustment of the cupholder arms. Such incremental adjustment may not be sufficient to hold cupholders of certain sizes because it may not provide a snug fit for holding the container. Also, such designs typically require that the cupholder arms be collapsed fully before they can be adjusted outward to receive a larger container. This may be inconvenient or awkward for a vehicle occupant, particularly the driver.

Accordingly, it is desirable to provide a collapsible vehicle cupholder structure which is infinitely adjustable for firmly securing containers of various sizes, and which does not require collapse prior to adjustment for receiving a larger container.

DISCLOSURE OF THE INVENTION

The present invention overcomes the above-referenced shortcomings of prior art vehicle cupholder assemblies by providing a vehicle cupholder assembly in which pivotal movement of the cupholder arms is frictionally inhibited sufficiently to facilitate infinite adjustment of the cupholder arms between fully extended and fully retracted positions for supporting containers of various sizes, without requiring collapse prior to adjustment for receiving larger containers.

More specifically, the present invention provides a cupholder assembly adapted for use in a vehicle for supporting containers, the vehicle having a receiving aperture for receiving the cupholder assembly. The cupholder assembly includes a tray adapted for slidable connection within the receiving aperture for sliding movement between storage and use positions. First and second cupholder arms are pivotally connected to the tray for pivotal movement between fully extended and fully retracted positions. Each cupholder arm includes a side wall for supporting a side of a container. Pivotal movement of each cupholder arm with respect to the tray is sufficiently frictionally inhibited to facilitate infinite adjustment of the cupholder arms between the fully extending and fully retracted positions for supporting containers of various sizes.

Preferably, the tray includes a pinching structure configured to provide the frictional inhibition of pivotal movement when the tray is in the use position, and to decrease the frictional inhibition of pivotal movement as the tray is moved toward the storage position. The first and second cupholder arms, preferably, each include a rubber portion configured to be pinched by the pinching structure to facilitate the frictional inhibition of pivotal movement.

In the preferred embodiment, the tray includes a base plate with a living hinge formed therein. As the tray is moved from the storage position to the use position, a cam is engaged to flex the living hinge for operation of the pinching structure for pinching the rubber portion of the cupholder arms for frictionally inhibiting pivotal movement of the cupholder arms. When the cupholder arms are frictionally inhibited from pivotal movement, the cupholder arms may be adjusted to an infinite number of positions between the fully extended and fully retracted positions for firmly grasping containers of various sizes.

Accordingly, an object of the present invention is to provide a vehicle cupholder assembly in which the cupholder arms are infinitely adjustable between fully extended and fully retracted positions for grasping containers of various sizes.

A further object of the invention is to provide a vehicle cupholder assembly in which the cupholder arms are sufficiently frictionally inhibited from pivotal movement to enable infinite adjustment of the cupholder arms for grasping containers of various sizes.

Another object of the invention is to provide a vehicle cupholder assembly including a tray moveable between storage and use positions, and pivotable cupholder arms which are frictionally inhibited from pivotal movement when the tray is in the use position, and are relatively free to pivot as the tray is moved from the use position toward the storage position.

A further object of the invention is to provide a cupholder assembly in which the cupholder arms do not require collapse prior to adjustment for receiving a larger container.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
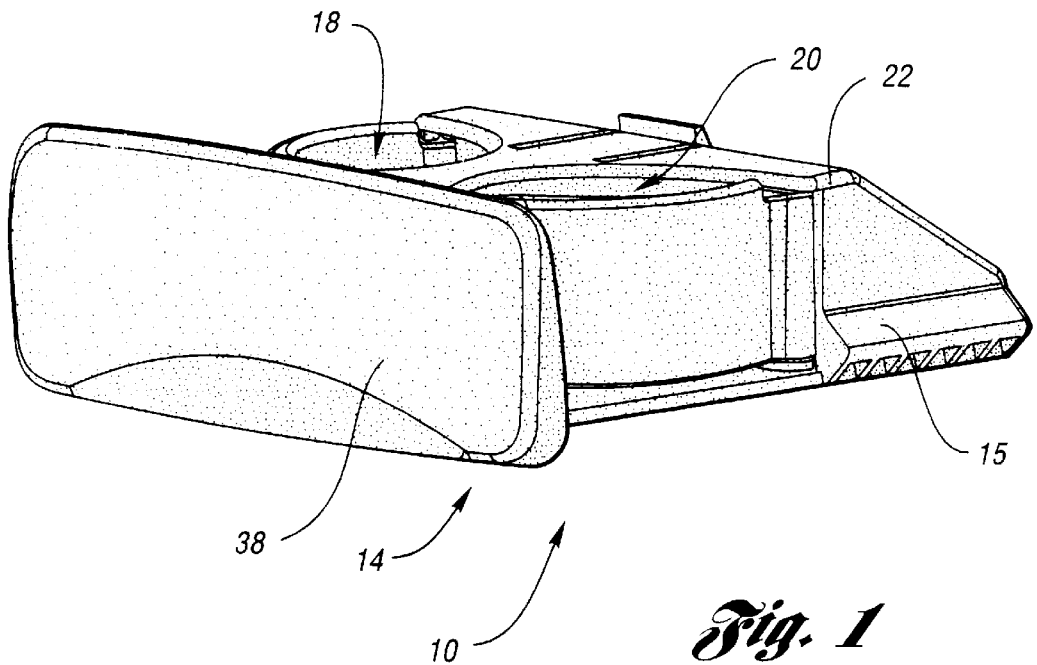
FIG. 1 shows a perspective view of a cupholder tray in accordance with the present invention.
Figure 2:
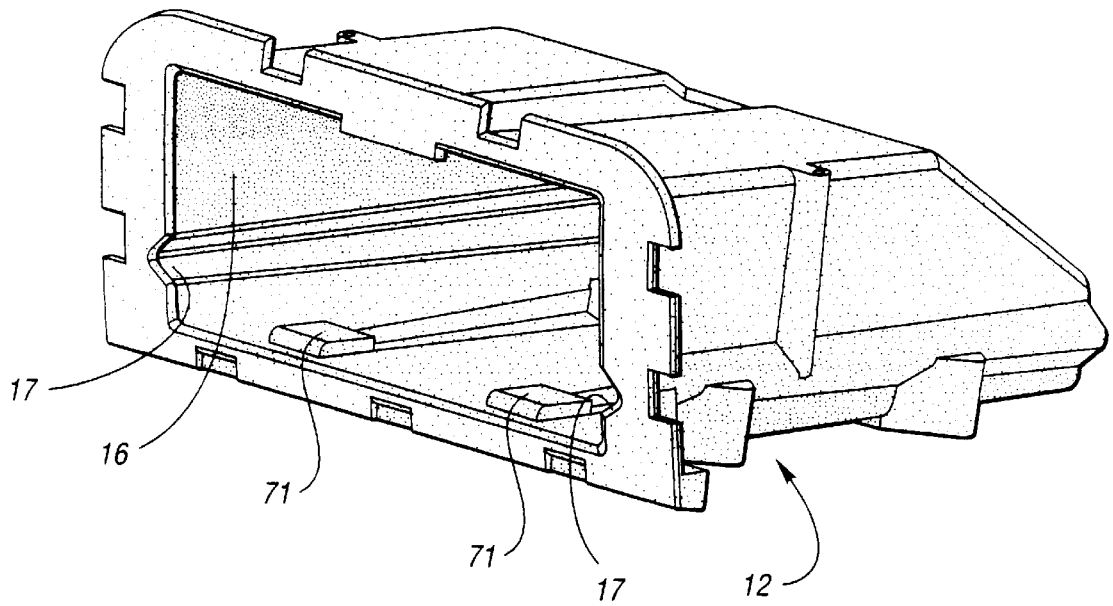
FIG. 2 shows a perspective view of a housing in accordance with the present invention.

A cupholder assembly 10 in accordance with the present invention is adapted for use in a vehicle for supporting containers, such as cups, cans, bottles, or other such containers. The cupholder assembly 10 includes a housing 12, as shown in FIG. 2, and a tray 14, shown in FIG. 1. The housing 12 includes a receiving aperture 16 formed therein for slidably receiving the tray 14. The tray 14 is slidably connected within the receiving aperture 16 for sliding movement between storage and use positions. In the storage position, the tray 14 is disposed almost entirely within the receiving aperture 16. In the use position, the tray 14 is extended sufficiently from the receiving aperture 16 to expose the cupholders 18,20 for use by vehicle occupants.

The tray 14 includes opposing guide ribs 15 configured to be received in the V-shaped guide channels 17 along the sides of the housing for guiding sliding movement of the tray 14 with respect to the housing 12.

The tray 14 is more clearly described with reference to FIGS. 3–7. The tray 14 includes a body portion 22 with a base plate 24 connected thereto by the screws 26, 28, 30, 32. The body portion 22 includes arcuate walls 34,36 which form an inner boundary of the cupholder areas 18,20. A front plate 38 is connected to the front of the body portion 22 for covering the cupholder assembly 10 when the tray 14 is positioned in the storage position within the receiving aperture 16 of the housing 12.

Figure 3:
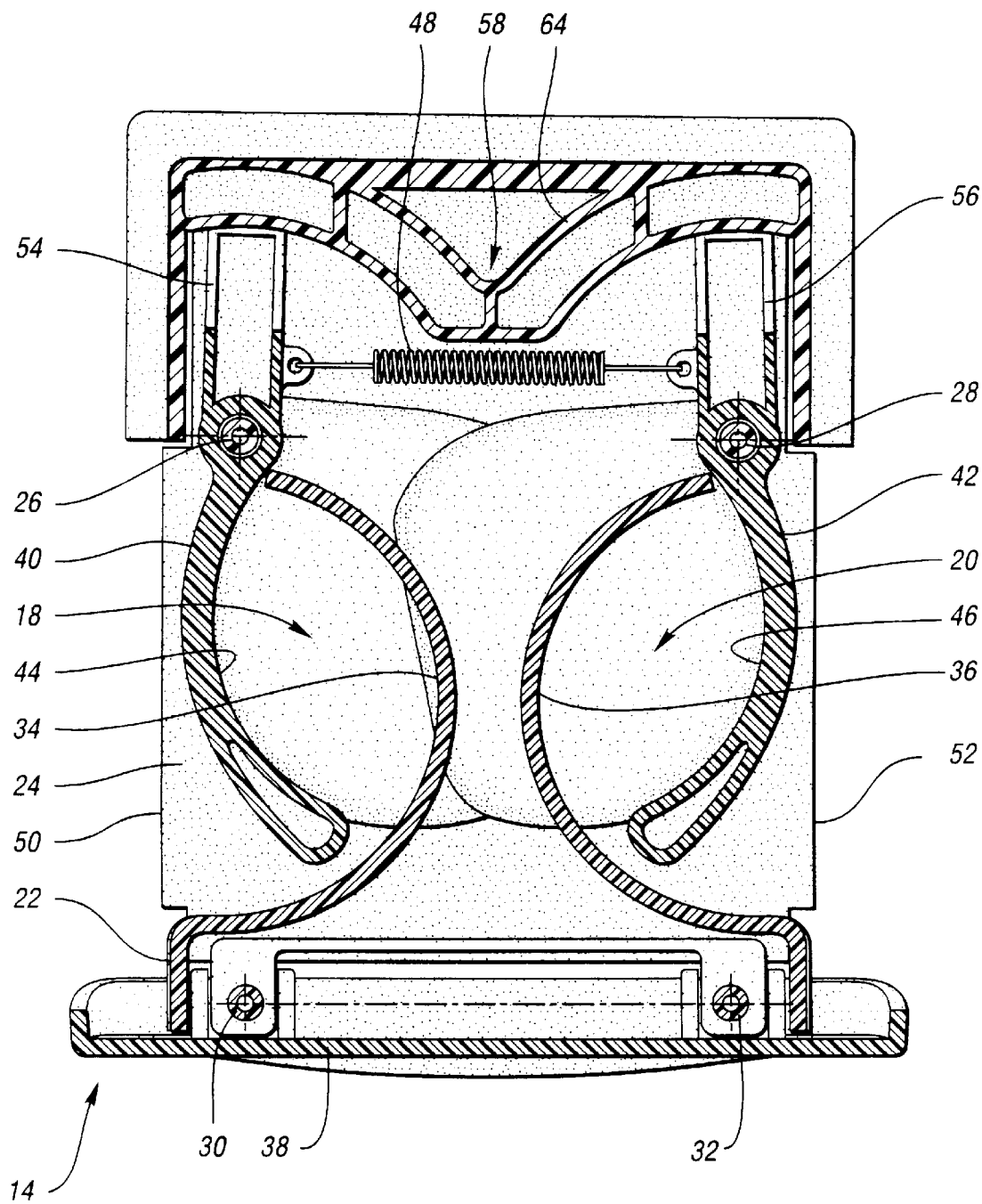
FIG. 3 shows a horizontal cross-sectional view of the cupholder tray of FIG. 1.
Figure 5:
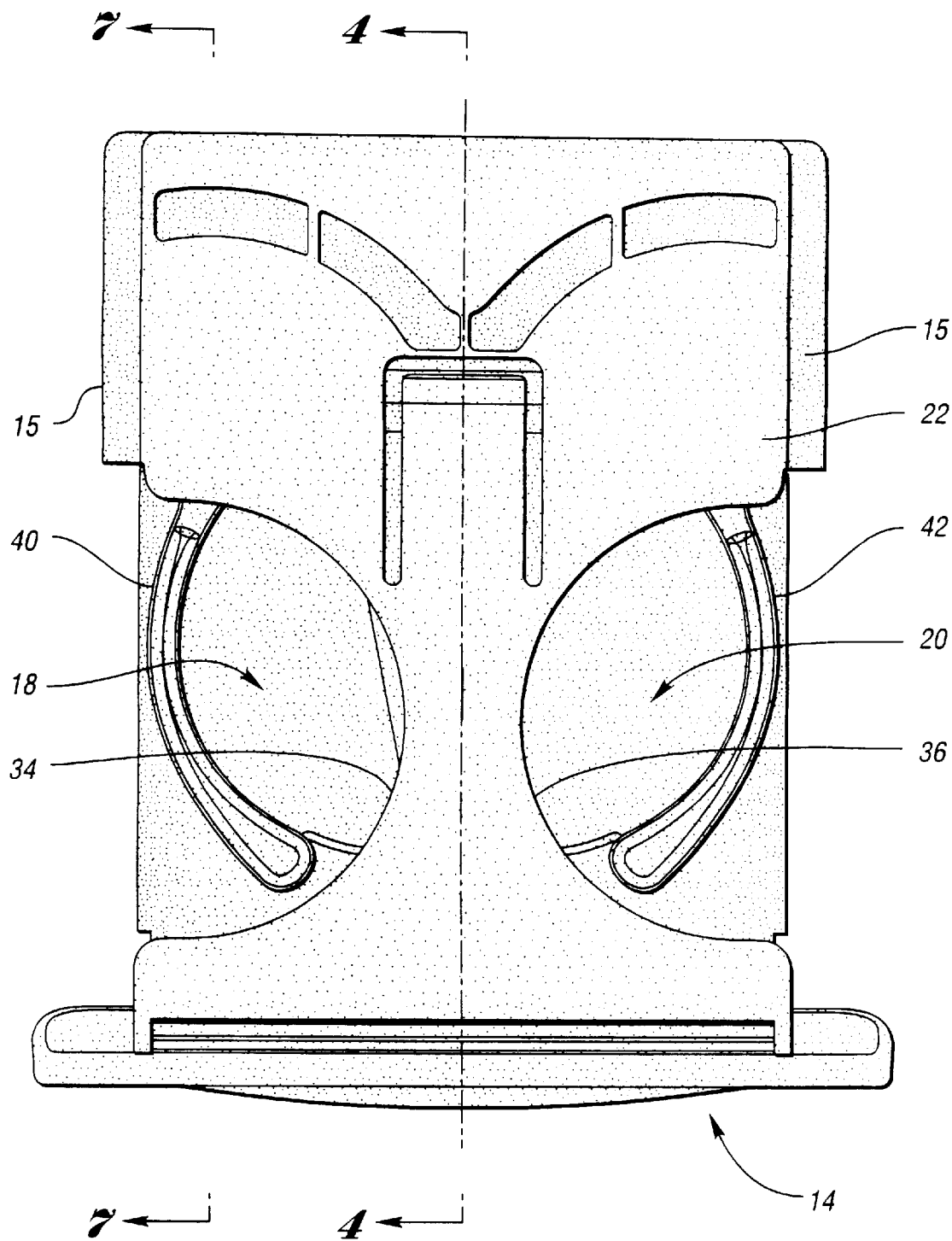
FIG. 5 shows a top plan view of the cupholder tray of FIG. 1.

First and second cupholder arms 40,42 are pivotally connected to the body portion 22 by the screws 26,28. The first and second cupholder arms 40,42 are pivotable between fully extended and fully retracted positions. The fully retracted position is shown in FIGS. 3 and 5. In the fully extended position, the cupholder arms 40,42 are pivoted away from the respective arcuate walls 34,36 to form the cupholder areas 18, 20 between the arms 40,42 and the arcuate walls 34,36. In the fully extended position, the cupholder arms 40,42 extend beyond the peripheral edges 50,52 of the base plate 24, shown in FIG. 3, to the point where the opposing ends 54,56 of the cupholder arms 40,42 abut against a stopper (not shown) positioned in the center portion 58 of the tray body portion 22. The cupholder arms 40,42 each include a side wall 44,46 for supporting a side of a container.

As shown in FIG. 3, a spring 48 is connected between the cupholder arms 40,42 in order to bias the cupholder arms 40,42 toward the respective fully extended positions.

The present invention is particularly characterized in that pivotal movement of each cupholder arm 40,42 with respect to the tray 14 is sufficiently frictionally inhibited to facilitate infinite adjustment of the cupholder arms 40,42 between the fully extended and fully retracted positions for supporting containers of various sizes.

Figure 7:
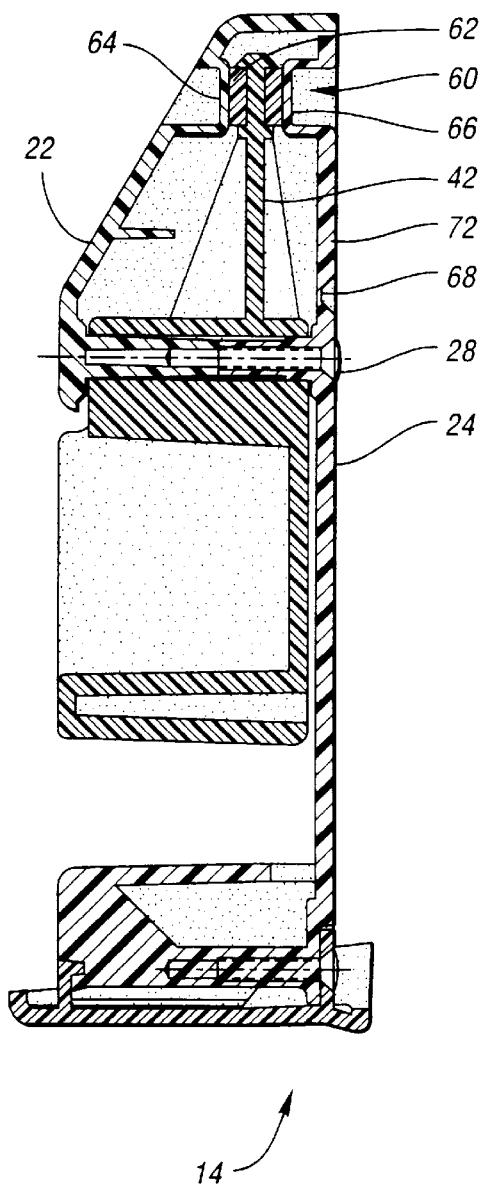
FIG. 7 shows a longitudinal cross-sectional view of the cupholder tray of FIG. 1.
Figure 6:
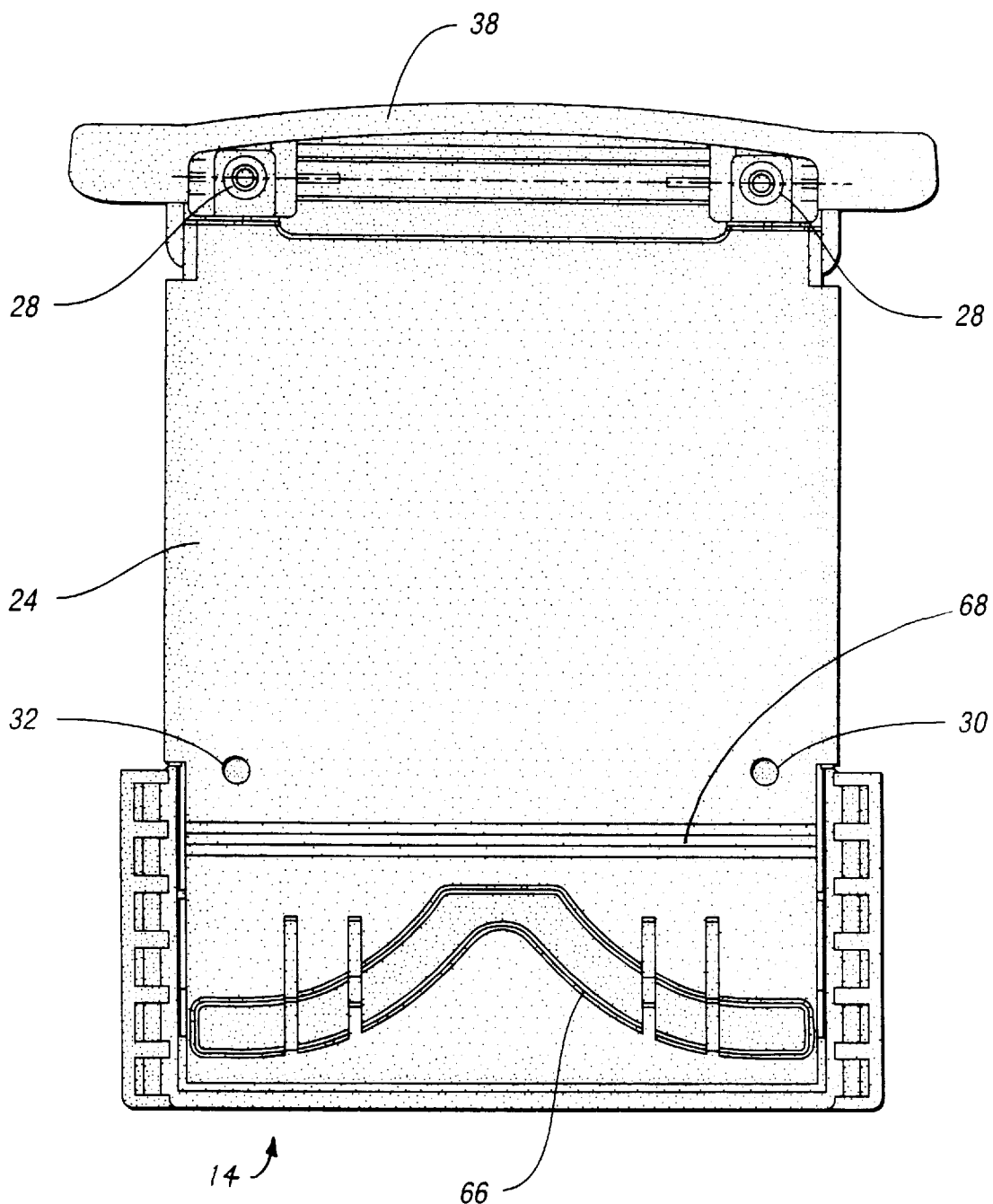
FIG. 6 shows a bottom plan view of the cupholder tray of FIG. 1.
Figure 8:
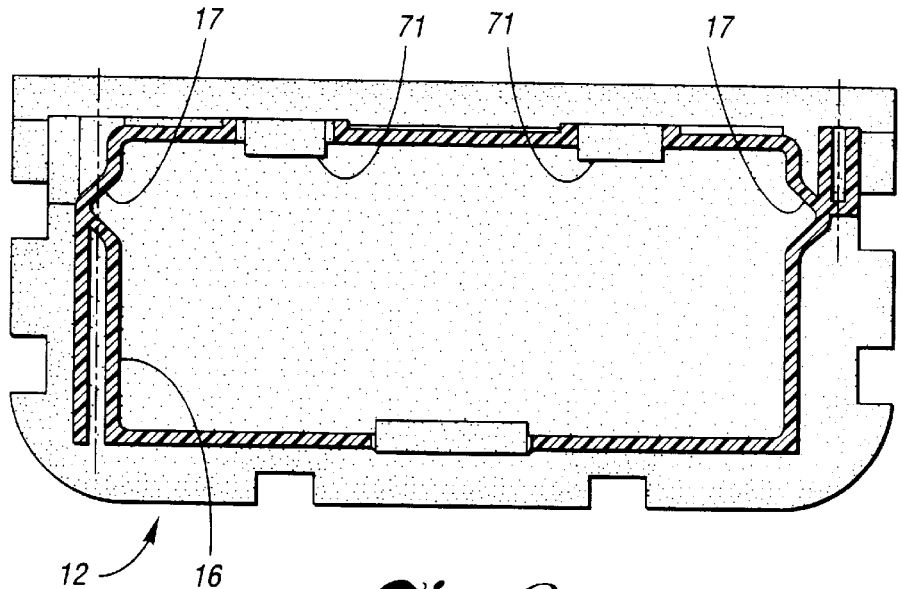
FIG. 8 shows a vertical cross-sectional view of the housing of FIG. 2.
Figure 9:
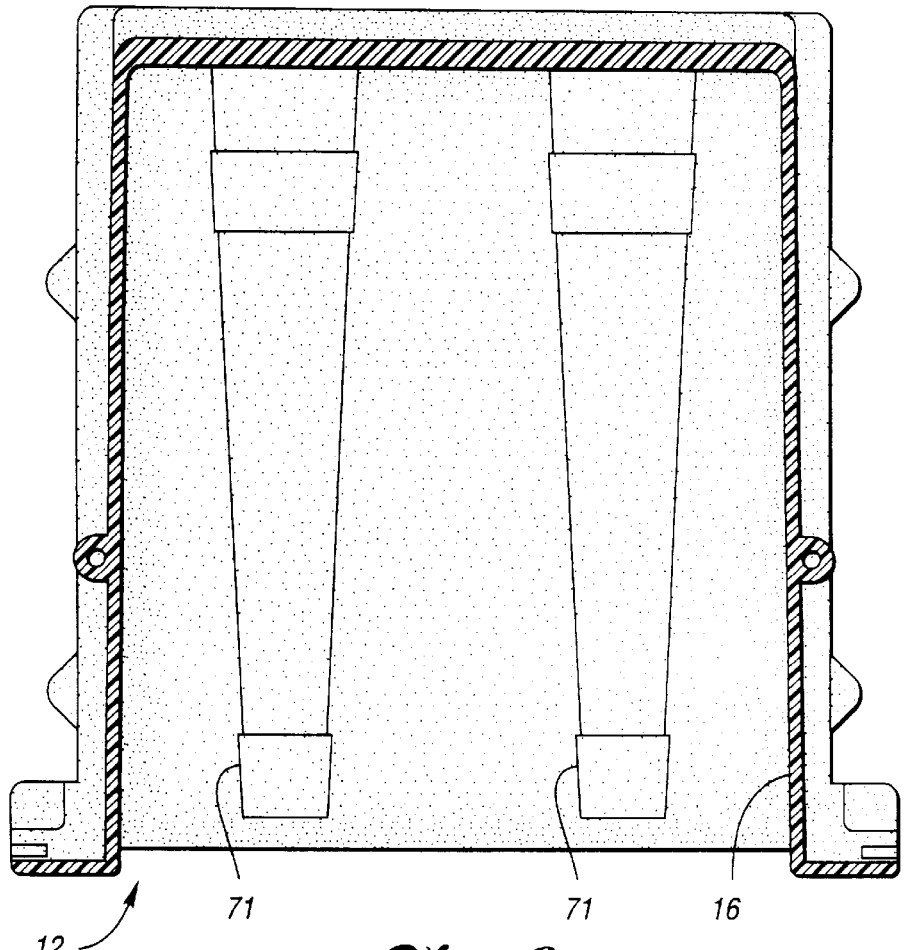
FIG. 9 shows a horizontal cross-sectional view of the housing of FIG. 2.
Figure 10:
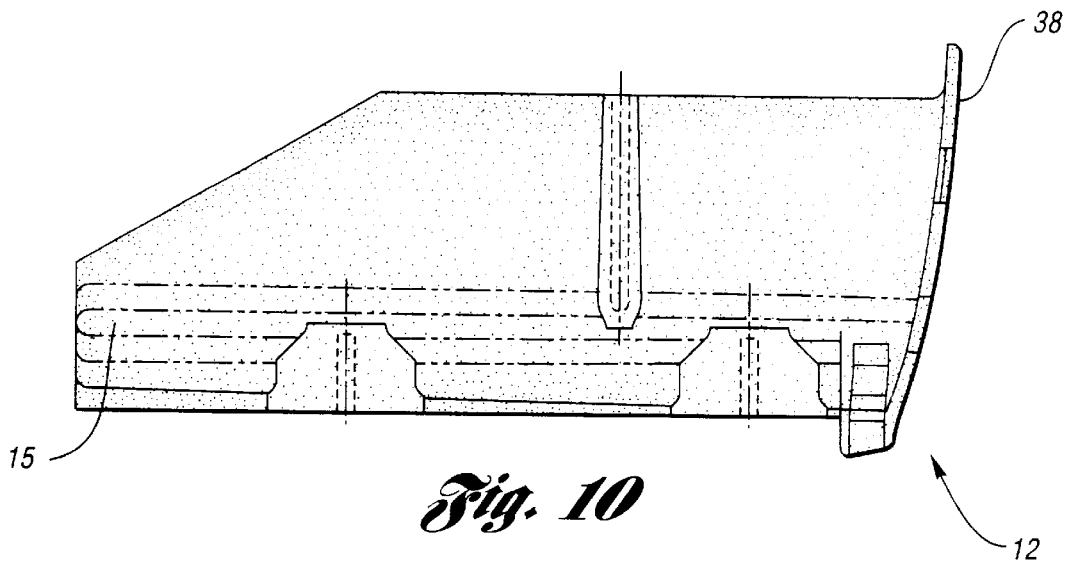
FIG. 10 shows a longitudinal vertical cross-section of the housing of FIG. 2.
Figure 11:
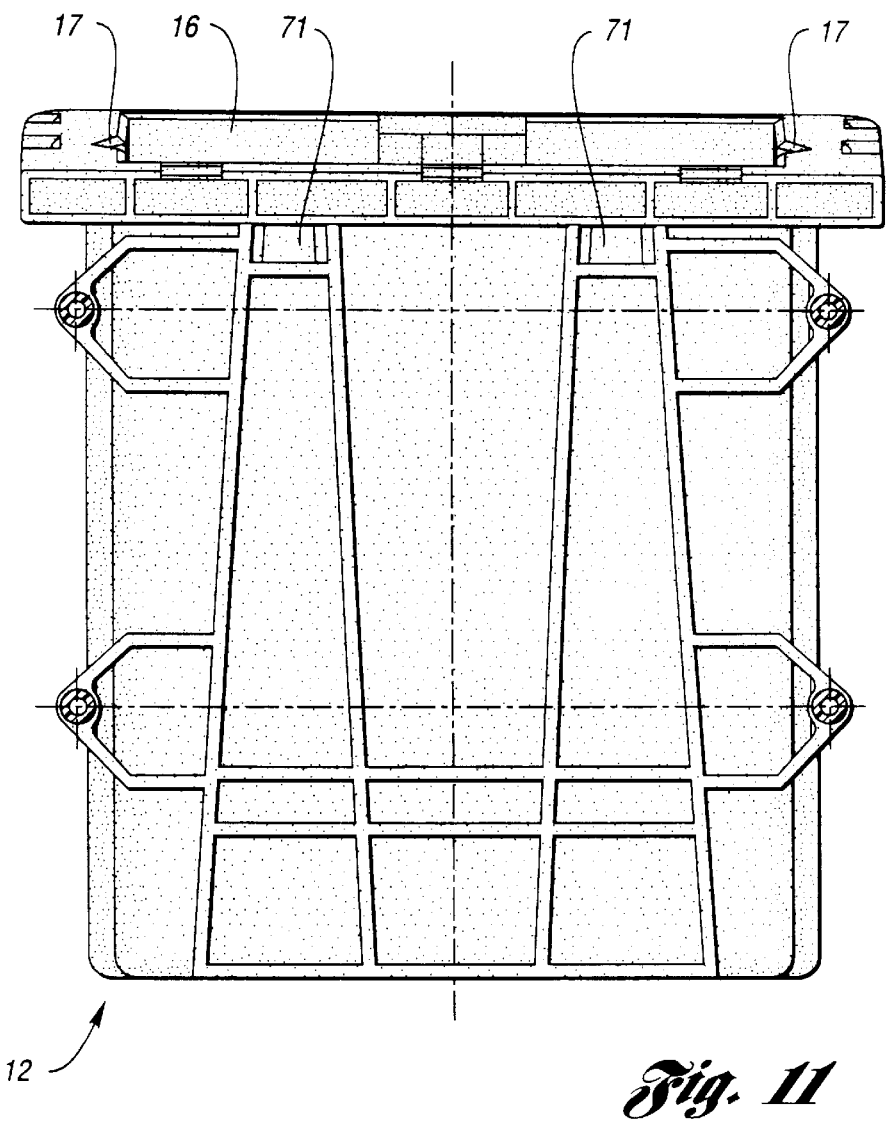
FIG. 11 shows a horizontal cross-sectional view of the housing of FIG. 2.

In order to accomplish said frictional inhibition of pivotal movement of the cupholder arms 40,42, a pinching structure 60 is provided, as shown in FIG. 7. The pinching structure 60 is configured to provide the frictional inhibition of pivotal movement when the tray 14 is in the use position, and to decrease the frictional inhibition of pivotal movement of the cupholder arms 40,42 as the tray 14 is moved toward the storage position within the receiving aperture 16 of the housing 12. As illustrated in FIG. 7, each cupholder arm 40,42 includes a rubber portion 62 configured to be pinched by the pinching structure 60 to facilitate the frictional inhibition of pivotal movement of the cupholder arms 40,42. Referring to FIGS. 3 and 7, the body portion 22 includes a curved rib structure 64 extending toward the rubber portion 62. Similarly, as shown in FIGS. 6 and 7, the base plate 24 includes a curved rib structure 66 extending toward the rubber portion 62.

Figure 4:
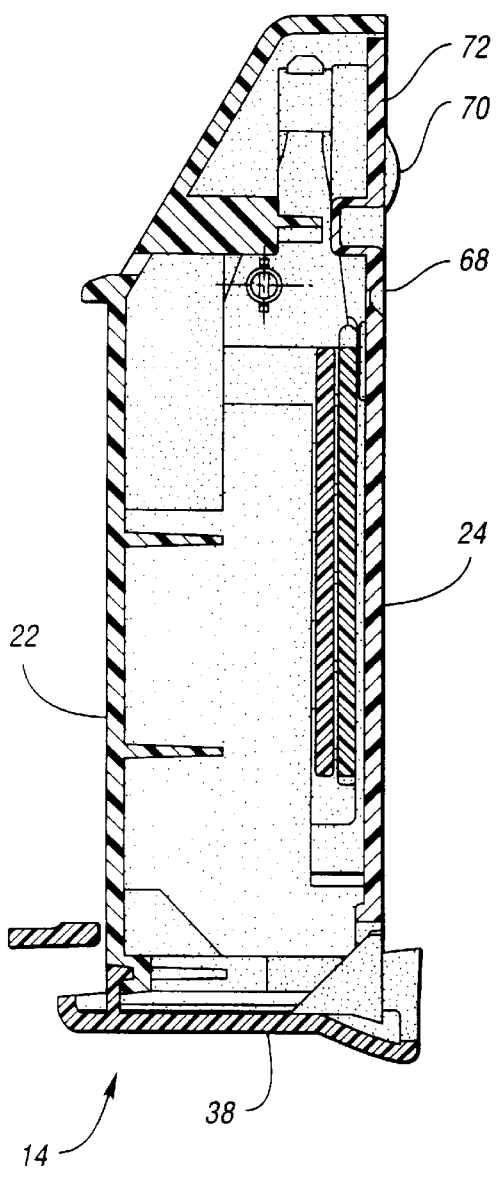
FIG. 4 shows a longitudinal cross-sectional view of the cupholder tray of FIG. 1.

As shown in FIGS. 4 and 7, the base plate 24 includes a living hinge 68 formed therein. The living hinge 68 is an area of thin cross-section to allow bending of the base plate 24 along the living hinge 68. As further shown in FIG. 4, the base plate 24 includes cams 70 formed therein. The cams 70 are positioned to engage the raised tabs 71 on the housing 12 in order to cause the rear portion 72 of the base plate 24 to flex about the living hinge 68 toward the rubber portion 62 to cause pinching of the rubber portion 62 between the curved rib structures 64,66, as shown in FIG. 7 for inhibiting pivotal movement of the first and second cupholder arms 40,42 about the screw 28.

Accordingly, in operation, when the tray 14 is moved from the storage position within the receiving aperture 16 of the housing 12 toward the use position extended from the receiving aperture 16, the cams 70 are engaged by the tabs 71 on the housing in order to cause flexing of the rear portion 72 of the base plate 24 about the living hinge 68 such that the rubber portion 62 of each cupholder arm 40,42 is pinched between the respective curved rib structures 64,66 of the body portion 22 and base plate 24 for frictionally inhibiting pivotal movement of the cupholder arms 40,42. Accordingly, with the tray 14 in the use position, the cupholder arms 40,42 are frictionally inhibited for movement, thereby facilitating adjustment of the cupholder arms 40,42 to an infinite number of adjusted positions between the fully extended and fully retracted positions for supporting containers of various sizes. The frictional engagement between the rubber portion 62 and the curved rib structures 64,66 is at a level which allows a vehicle occupant to pivot the cupholder arms 40,42 by introducing sufficient force about the pivot joints (screws 26,28), while being at a friction level sufficient to remain in a selected position to firmly secure a container within the cupholder areas 18,20. Preferably, the curved rib structures 64,66 are plastic and the rubber portion 62 is any common grade rubber in order to provide the desired amount of friction when the pinching action is applied.

As the tray 14 is returned from the use position toward the storage position within the receiving aperture 16 of the housing 12, the cams 70 are disengaged from the tabs 71 to alleviate the pinching action of the curved rib structures 64,66 against the rubber portion 62, thereby eliminating the frictional inhibition of pivotal movement. Accordingly, the cupholder arms 40,42 may freely collapse to the fully retracted position as the tray 14 is slid into the receiving aperture 16 of the housing 12.

Referring to FIGS. 8, 9, 10, and 11, the housing 12 is shown in greater detail.

While the best mode for carrying out the invention has been described in detail, those familiar with the art to which this invention relates will recognize various alternative designs and embodiments for practicing the invention within the scope of the appended claims.

What is claimed is:

1. A cupholder assembly adapted for use in a vehicle for supporting containers, the vehicle having a receiving aperture for receiving the cupholder assembly, the cupholder assembly comprising:

a tray adapted for slidable connection within the receiving aperture for sliding movement between storage and use positions; and first and second cupholder arms pivotally connected to said tray for pivotal movement between fully extended and fully retracted positions, each said cupholder arm including a side wall for supporting a side of a container;

wherein pivotal movement of each said cupholder arm with respect to the tray is directly frictionally inhibited by a rubber portion in contact with the arms to facilitate infinite adjustment of the cupholder arms between said fully extended and fully retracted positions for supporting containers of various sizes as the tray is in the use position.

2. The cupholder assembly of claim 1, wherein said tray comprises a pinching structure configured to frictionally inhibit pivotal movement of each said cupholder arm with respect to the tray when the tray is in the use position, and to decrease frictional inhibition of pivotal movement as the tray is moved toward the storage position.

3. The cupholder assembly of claim 2, wherein said first and second cupholder arms each comprise said rubber portion configured to be pinched by said pinching structure to facilitate said frictional inhibition of pivotal movement.

4. The cupholder assembly of claim 3, wherein said pinching structure comprises:
   a base plate of said tray having a living hinge formed therein; and
   a cam formed in said base plate to cause flexing of said living hinge as the tray is moved toward the use position to facilitate pinching of said rubber portions.

5. The cupholder assembly of claim 4, wherein said tray comprises said base plate and a tray body, wherein the base plate and tray each include a curved rib structure extending toward said rubber portions for pinching said rubber portions therebetween.

6. The cupholder assembly of claim 5, further comprising a spring biasing said cupholder arms toward the respective fully extended positions.

7. A cupholder assembly adapted for use in a vehicle for supporting containers, the cupholder assembly comprising:
   a housing having a receiving aperture formed therein;
   a tray slidably connected within the receiving aperture for sliding movement between storage and use positions; and
   first and second cupholder arms pivotally connected to said tray for pivotal movement between fully extended and fully retracted positions, each said cupholder arm including a side wall for supporting a side of a container;
   wherein pivotal movement of each said cupholder arm with respect to the tray is sufficiently frictionally inhibited to facilitate infinite adjustment of the cupholder arms between said fully extended and fully retracted positions for supporting containers of various sizes;
   wherein said tray comprises a pinching structure configured to frictionally inhibit pivotal movement of each said cupholder arm with respect to the tray when the tray is in the use position, and to decrease frictional inhibition of pivotal movement as the tray is moved toward the storage position;
   wherein said first and second cupholder arms each comprise a rubber portion configured to be pinched by said pinching structure to facilitate frictional inhibition of pivotal movement; and
   wherein said housing comprises at least one raised tab, and said pinching structure comprises a base plate of said tray having a living hinge formed therein, and a cam formed in said base plate and engagable with said at least one raised tab to cause flexing of said living hinge as the tray is moved toward the use position to facilitate pinching of said rubber portions.

8. The cupholder assembly of claim 7, wherein said tray comprises said base plate and a tray body, each of said base plate and said tray including a curved rib structure extending toward said rubber portions for pinching said rubber portions therebetween.

9. The cupholder assembly of claim 8, further comprising a spring biasing said cupholder arms toward the respective fully extended positions.

10. The cupholder assembly adapted for use in a vehicle for supporting containers, the cupholder assembly comprising:
    a housing having a receiving aperture formed therein and a raised tab;
    a tray slidably connected within the receiving aperture for sliding movement between storage and use positions;
    first and second cupholder arms pivotally connected to said tray for pivotable movement between fully extending and fully retracted positions, each said cupholder arm including a side wall for supporting a side of a container;
    wherein said tray includes a cam engageable with said raised tab, such that engagement of the cam with the raised tab sufficiently frictionally inhibits pivotal movement of each cupholder arm to facilitate infinite adjustment of the cupholder arms between said fully extended and fully retracted positions for supporting containers of various sizes.

11. The cupholder assembly of claim 10, wherein said tray comprises a pinching structure configured to provide said frictional inhibition of pivotal movement when the tray is in the use position, and to decrease said frictional inhibition of pivotal movement as the tray is moved toward the storage position.

12. The cupholder assembly of claim 11, wherein said first and second cupholder arms each comprise a rubber portion configured to be pinched by said pinching structure to facilitate said frictional inhibition of pivotal movement.

13. The cupholder assembly of claim 12, wherein said pinching structure comprises:
    a base plate of said tray having a living hinge formed therein; and
    said cam being formed in the base plate to cause flexing of said living hinge as the tray is moved toward the use position to facilitate pinching of said rubber portions.

14. A cupholder assembly adapted for use in a vehicle for supporting containers, the cupholder assembly comprising:
    a housing having a receiving aperture formed therein, said housing including at least one raised tab;
    a tray slidably connected within the receiving aperture for sliding movement between storage and use positions, said tray including a cam engagable with the raised tab; and
    first and second cupholder arms pivotally connected to said tray for pivotal movement between fully extended and fully retracted positions, each said cupholder arm including a sidewall for supporting a side of a container;
    wherein engagement of the cam with the raised tab frictionally inhibits pivotal movement of the cupholder arms when the tray is in the use position.

* * * * *